United States Patent [19]

Dawson et al.

[11] 3,713,988
[45] Jan. 30, 1973

[54] NON-RAMIFIED CULTURE GROWING APPARATUS

[75] Inventors: Peter S. S. Dawson; Wolfgang G. W. Kurz; Moffat Anderson; Arthur E. York, all of Saskatoon, Saskatchewan, Canada

[73] Assignee: Canadian Patents and Development Limited, Ottawa, Ontario, Canada

[22] Filed: March 8, 1971

[21] Appl. No.: 121,694

[30] Foreign Application Priority Data

May 8, 1970    Canada..............................082,268

[52] U.S. Cl. ................195/143, 195/109, 195/127, 195/139
[51] Int. Cl. ..............................................C12b 1/00
[58] Field of Search..............195/143, 109, 127, 139; 222/190

[56] References Cited

UNITED STATES PATENTS 3,201,327    8/1965    Beck................................195/143 X Primary Examiner—A. Louis Monacell
Assistant Examiner—William Andrew Simons
Attorney—James R. Hughes

[57] ABSTRACT

A non-ramified culture growing apparatus wherein an inner domed surface of a glass bell-jar provides a culture draining surface, and culture is circulated by a fluid operated, diaphragm pump from a lower portion of the bell-jar along a pipe to be sprayed on to the draining surface by a nozzle.

9 Claims, 5 Drawing Figures

PATENTED JAN 30 1973

3,713,988

SHEET 1 OF 3

INVENTORS
PETER S.S. DAWSON
WOLFGANG G.W. KURZ
MOFFAT ANDERSON
ARTHUR E. YORK
By J.R. Hughes
AGENT

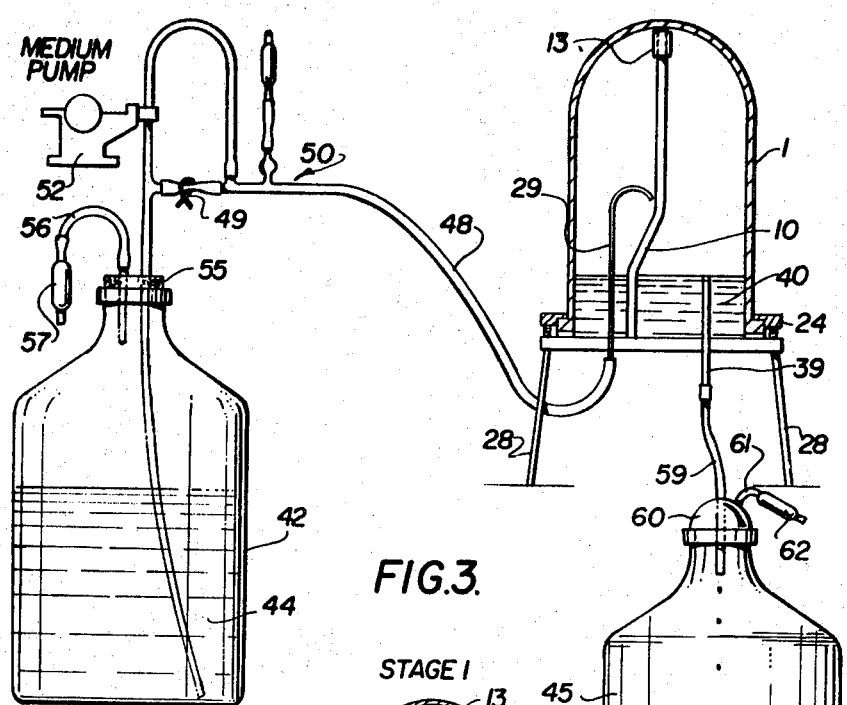
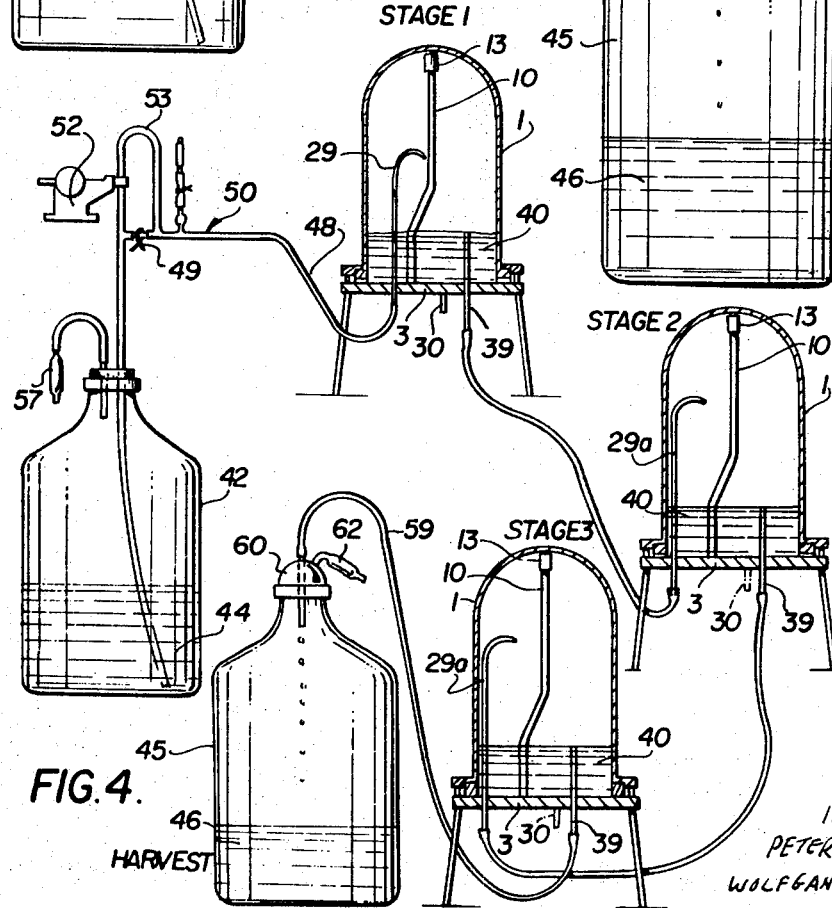

NON-RAMIFIED CULTURE GROWING APPARATUS

This invention relates to a non-ramified culture growing apparatus.

Known types of culture growing apparatus use circulation pumps which have impeller blades and these pumps cannot be used for growing cultures of organisms which are sensitive to the shearing effects of the impeller blades.

It is an object of the invention to provide a culture growing apparatus which has a circulation pump having no impeller blades, and which thus facilitates the use of the apparatus for growing cultures of organisms sensitive to the shear stresses of pump impellers.

The culture growing apparatus of the invention, however, has not been found suitable for growing cultures of filamentous organisms producing ramified growths.

According to the invention there is provided a non-ramified culture growing apparatus, comprising a vessel sealed from the surrounding atmosphere and having a culture draining surface in an upper portion thereof, conveying means for conveying culture from a lower portion of said vessel to said upper portion thereof, dispersing means for dispersing said conveyed culture as a film for draining down said draining surface to said lower portion, a fluid operated diaphragm pump for pumping culture along said conveying means, and a non-return valve connected to the culture inlet of said pump for causing culture to flow in the pumping direction.

Figure 1:
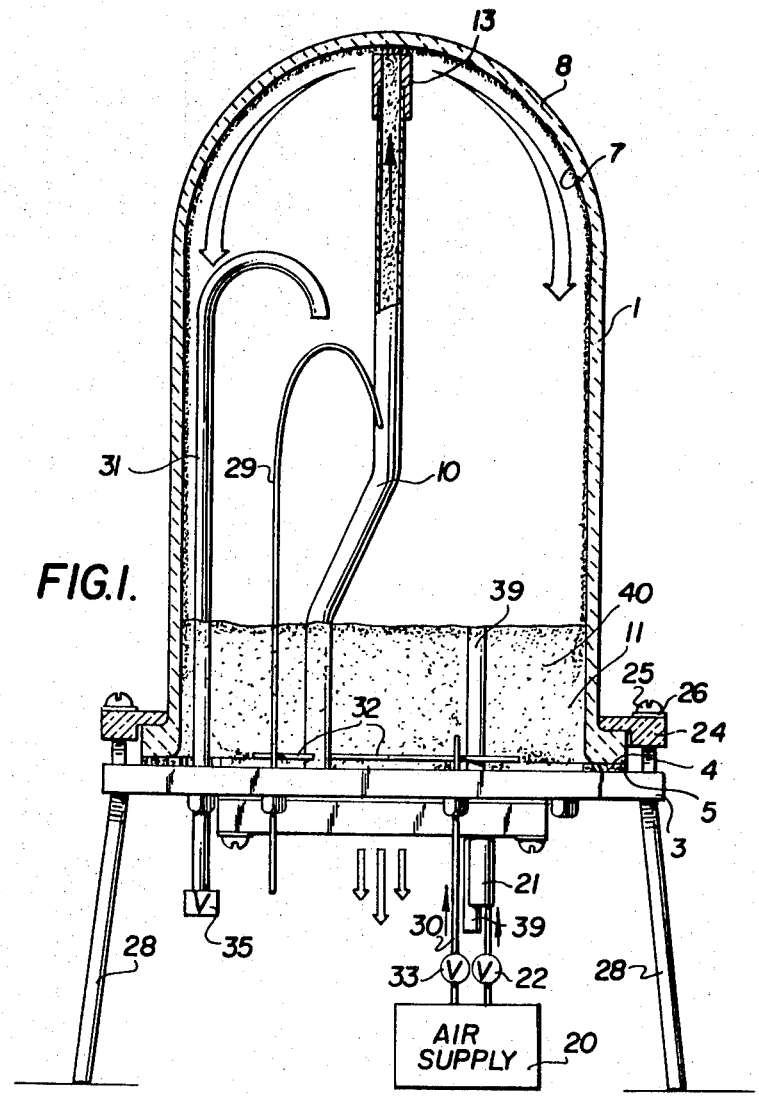
Figure 2:
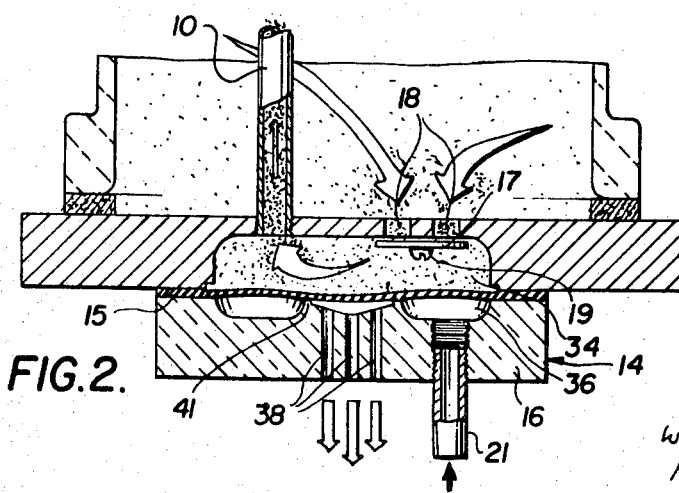
Figure 5:
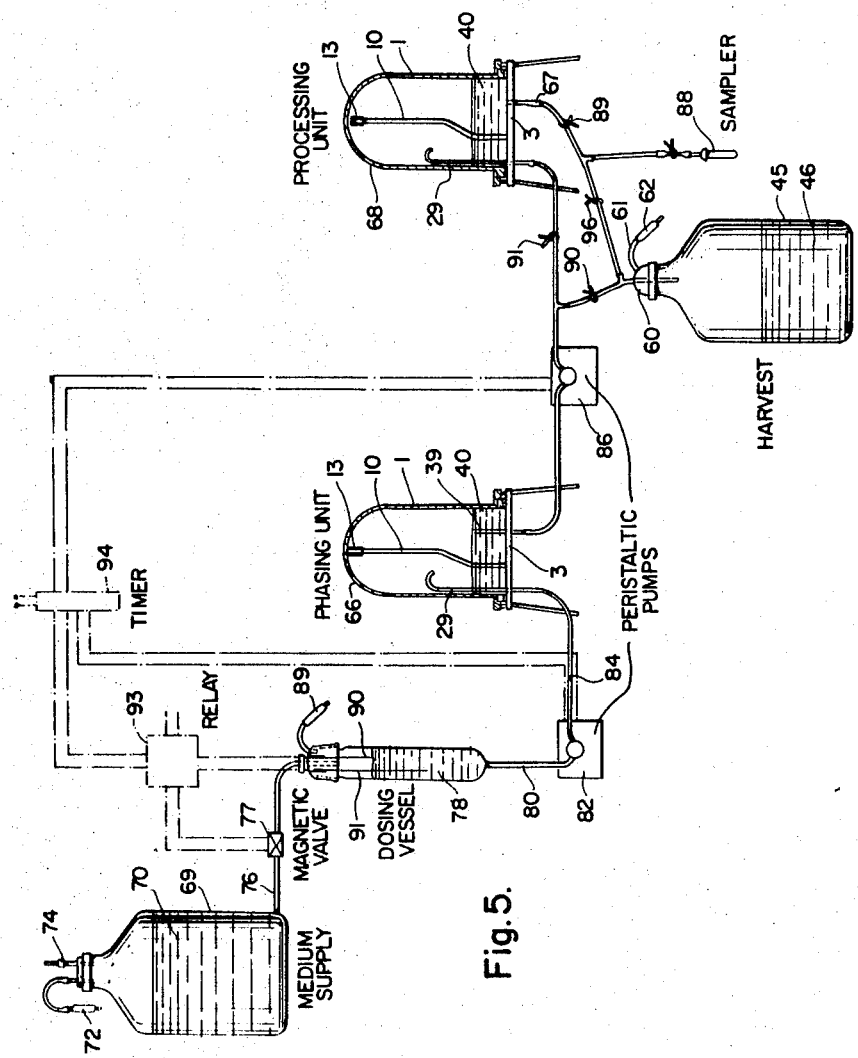

In the accompanying drawings which illustrate, by way of example, embodiments of the invention, FIG. 1 is a partly sectioned side view of a culture vessel of a culture growing apparatus, FIG. 2 is an enlarged sectional side view of a part of the culture vessel shown in FIG. 1, revealing the diaphragm pump, FIG. 3 is a partly sectioned outline of the apparatus shown in FIGS. 1 and 2, connected to medium supply and culture receiving vessels, FIG. 4 is a diagrammatic view of a multistage chemostat assembly, and FIG. 5 is a diagrammatic view of an apparatus for phased or synchronous culture growth.

In FIGS. 1 and 2 there is shown a vessel in the form of a heat resisting soda-alumina-borosilicate, plain top glass bell-jar 1 which is sealed by means of a ground glass rim 4 from the surrounding atmosphere to a stainless steel base plate 3 by a rubber gasket 5. The inside surface 7 of the domed upper portion 8 of the bell-jar forms a culture draining surface in the upper portion of the bell-jar 1. A culture dispersing pipe 10 (shown partly sectioned) in the bell-jar 1 forms a conveying means for conveying culture from a lower portion 11 of the bell-jar 1. Dispersing means in the form of a polytetrafluoroethylene nozzle 13 is provided for dispersing culture down the surface 7 to the lower portion 11, after it has been conveyed along the pipe 10. The nozzle 13 is a piece of tubing which has been forced over the end of the pipe 10 and is spaced one-sixteenth inch from a central portion of the surface 7 to form an umbrella-shaped flow of culture.

A fluid operated diaphragm pump generally designated 14 (FIG. 2) is formed from a portion of the base plate 3, a reinforced neoprene diaphragm 15, and a brass body 16, and is provided for pumping culture along the pipe 10. A non-return valve in the form of a reinforced neoprene flap-valve 17 is connected by a bolt 19 to the base plate 3 to overlap culture inlets 18 of the pump 14 for causing culture to flow in the pumping direction. A source of pumping fluid, in this instance a pressurized air from a central supply 20, containing air at 12 to 15 p.s.i., is connected to an inlet pipe 21 to the diaphragm pump 14 via a needle valve 22.

The rubber gasket 5 is clamped between the glass rim 4 and the base plate 3 by a brass retaining ring 24 through which bolts 25 provided with washers 26 pass and are screwed into the base plate 3. The base plate 3 is provided with four legs 28. A culture inlet feed pipe 29 and an air inlet pipe 30 to, and an air outlet pipe 31 from the bell-jar 1 each extend through and are sealed to the base plate 3. The air inlet pipe 30, which has a valve 33, and air outlet pipe 31, which has a valve 35, are each fitted with a glass fiber filter (not shown).

The pipe 10 has a number of small stainless steel tubes 32 (FIG. 1) joined to it over perforations therein. The tubes 32 each extend along orbital-like curved paths from the pipe 10 towards an open end of that tube 32.

The diaphragm 15 (FIG. 2) seals a culture cavity 34 in the base plate 3 from a annular, air cavity 36 in the body 16. The cavity 34 is open to the base of the pipe 10 and is sealed from the inlets 18 by the flap valve 17. The cavity 36 has an air inlet 21 and air outlets 38 surrounded by an annular rim 41. A stainless steel culture outlet pipe 39 extends through the base plate 3 to one side of the brass body 16. The pipe 39 extends into the bell-jar 1 to trap culture 40 in the lower portion thereof.

In the embodiments shown in FIG. 3 a diagrammatic side view of the apparatus of FIG. 1 is shown connected to a vessel 42 containing a non-ramified culture growing medium 44, and a vessel 45 for receiving a harvest 46 of non-ramified culture from the culture 40.

The medium inlet feed pipe 29 is connected to the vessel 42 by tubing 48 containing a clamp 49 and flow meter 50. A pump 52 is provided for pumping the medium 44 from the vessel 42 through the tubing 48 into the bell-jar 1 through the feed pipe 29. The vessel 42 is a glass jar fitted with a bung 55 through which the tubing 48 extends. A vent tube 56 also extends through the bung 55 and is fitted with an air filter 57.

The vessel 45 is connected by tubing 59 to the culture outlet pipe 39. The vessel 45 is a glass jar fitted with a bung 60 through which the tubing 59 extends. A vent tube 61 also extends through the bung 60 and is fitted with an air filter 62.

In operation the apparatus is assembled as shown in FIG. 1 without the culture 40 therein, and not connected to the additional apparatus shown in FIG. 3. It should be noted that the air inlet pipe 21 is not connected to the air supply 20 (FIG. 2) or needle valve 22.

The medium inlet feed pipe 29 is plugged by a plug (not shown) and a one-way stopcock (not shown) is attached to the air inlet pipe 30. The apparatus is then sterilized in an autoclave (not shown).

After being cooled the apparatus is connected to the additional apparatus shown in FIG. 3 and then inoculated with culture 40 under aseptic conditions. Fresh medium is provided by activating the pump 52. The apparatus is then connected to the air supply 20 and the needle valve 22.

With the valve 35 closed the valve 33 is opened to admit air to the interior of the bell-jar 1. Since air cannot escape from the bell-jar 1 the air pressure inside it increases, and this is allowed to continue until a pressure of 3 p.s.i. has been attained therein. This air pressure forces culture 40 through the flap valve 17 and into the culture cavity 34. The culture 40 moving into the culture cavity 34 causes the diaphragm 15 to be pressed against the annular rim 41 and seal the outlets 38. The needle valve 22 is then opened permanently, the valve 17 is closed, and the air pressure within the air cavity 36 is then allowed to build up to pressurize the culture 40 within the culture cavity 34, through the diaphragm 15, and close the flap valve 17. As the air pressure within the air cavity 36 increases further the culture 40 trapped within the culture cavity 34 is forced by the diaphragm 15 into the culture dispersing pipe 10. The culture 40 travels up the pipe 10 and is dispersed on to the surface 7 to form a thin, umbrella-shaped flowing film of culture draining down the surface 7, as illustrated by the arrows X in FIG. 1.

As the culture 40 is discharged from the culture cavity 34 the diaphragm 15 uncovers the air outlets 38 and allow air to escape through them from the air cavity 36. At this point the diaphragm collapses allowing fresh culture 40 to enter the culture cavity 34 under the pressure existing in the glass bell-jar 1, and the cycle is repeated once more. Thus the pressure in the glass bell-jar 1 repeatedly forces the culture 40 into the culture cavity 34 to seat the diaphragm 15 on to the rim 41, and each time this occurs the air pressure in the air cavity 36 increases to close the flap valve 17 and force culture 40 up through the pipe 10 until the air pressure in the air cavity 36 drops sufficiently for the flap valve 17 to open once more and the diaphragm 15 seals on the rim 41 once more. It should be noted that a small portion of the culture 40 which is passed to the pipe 10 flows out of the tube 32 to gently agitate the culture 40 in the lower portion of the glass bell-jar 40.

The apparatus may be used for batch, single or multistage chemostat, or phased culture. In the arrangement shown in FIG. 3 the apparatus is shown used for single stage chemostat operation.

With the apparatus functioning as described above and connected to the additional apparatus shown in FIG. 3, a sterile supply medium 44 is pumped continuously from vessel 42 by pump 52 into the glass bell-jar 1 through feed pipe 29. The pump 52 is a known piston type metering pump made of stainless steel, and the rate of flow of supply medium 44 through the pump can be adjusted by a micrometer adjustment (not shown) of the piston stroke (not shown) until the desired rate of flow is indicated by the flowmeter 50. A constant volume of culture 40 is established in the glass bell-jar 1 by the culture outlet pipe 39 into which excess culture 40 overflows and passes to the vessel 45. It should be noted that on the air filter 62 a valve similar to valve 35 (FIG. 1) is attached to retain the air pressure at around 3 p.s.i. in the glass bell-jar 1.

In order to use the apparatus shown in FIG. 3 for batch production the pump 52 is operated intermittently to replenish the medium 40 within the glass bell-jar 1.

In FIG. 4 there is shown a diagrammatic view of a multistage chemostat assembly incorporating three culture growing apparatus of the type shown in FIGS. 1 and 2. Similar parts in FIG. 4 to those shown in FIGS. 1 to 3 are designated by the same reference numerals, and the previous description is relied upon to describe them. Not all of the apparatus shown in FIGS. 1 and 2 is shown in FIG. 4, but it will be appreciated that even though it is not shown it is in fact intended to be present.

It should be noted that the culture outlet pipes 39 from the first two glass bell-jars 1 are each connected to culture inlet feed pipe 29a to the next glass bell-jar 1, whilst the medium inlet feed pipe 29 of the first glass bell-jar 1 is connected to the vessel 42. Thus each assembly similar to that shown in FIGS. 1 and 2 provides fermentation stage between the vessel 42 and the vessel 45.

The operation of the apparatus shown in FIG. 4 is similar to the operation of the apparatus shown in FIGS. 1 to 3 except that the culture 40 is pumped from one glass bell-jar 1 to another until it is collected in the vessel 45.

The variations that can be made in the apparatus are numerous. For example the successive stages can be made of different capacities, the volume of the culture 40 can be changed by altering the height of the outlet pipes 39 in their respective glass bell-jar. A straight through flow of culture may be used as illustrated or additions may be made at any of the stages of supplements such as, for example, precursors, specific nutrients, or reagents.

Air supplied to the first stage through the air inlet pipe 30 subsequently passes out with the culture 40 through outlet pipe 39 and helps to maintain the flow of culture 40 from one glass bell-jar 1 to the next one. Additional air may be supplied to any one or all of the subsequent stages as required through respective air inlet pipes 30 (shown chain dotted) in each stage.

It will be appreciated that more or less than the three stages shown in FIG. 4 may be used if desired.

In FIG. 5 there is shown a diagrammatic view of an apparatus used for phased or synchronous culture growth, and incorporating two of the assemblies shown in FIGS. 1 and 2. In FIG. 5 similar parts to those shown in FIGS. 1 and 2 are designated by the same reference numerals, and the previous description is relied upon to describe them. Whilst all of the apparatus shown in FIGS. 1 and 2 is not illustrated in FIG. 5, it will be understood that it is all intended to be included in the processing unit assembly 68.

In FIG. 5 there is shown an assembly 66 and an assembly 68. The assembly 68 is similar to the apparatus shown in FIGS. 1 and 2 except that a culture outlet pipe 67 is provided which does not extend into the bell-jar 1 to trap culture and it is controlled by an exit clamp 89. The assembly 66 is a phasing unit and includes only the apparatus shown from that illustrated in FIGS. 1 and 2 and the assembly 68 is a processing unit. A medium supply vessel 69 contains supply medium 70. The vessel 69 has an air filter 72 and a supply pipe 74. An outlet pipe 76 from the vessel 69 is connected to a solenoid valve 77, which in turn is connected to a dosing vessel 78. An outlet 80 from the vessel 78 is connected to a peristaltic pump 82, and an outlet 84 from the peristaltic pump 82 is connected to the inlet pipe 29 of the assembly 66. The outlet pipe 39 from the assembly 66 is connected to the inlet of a peristaltic pump 86. The outlet from the peristaltic pump 86 is connected to a T junction 87 which delivers culture to the inlet pipe 29 of assembly 68 or to the vessel 45. The outlet pipe 39 from the assembly 68 delivers culture to a sampler 88 or to the vessel 45.

The dosing vessel 78 has an air filter 89, and two electrodes 90 and 91 which are of different lengths and both connected to a relay 93 (shown chain-dotted). The relay 93 is connected to the solenoid valve 77 and to a timer 94 (shown chain-dotted). The timer 94 is connected to the peristaltic pumps 82 and 86. Clamps 90 and 92 are provided in addition to the clamp 89. If desired clamps 91 and 96 may replace clamps 90 and 92 respectively.

In operation the assembly 68 operates as previously described. The relay 93 actuates the solenoid valve 77 to cause medium 70 to fill the dosing vessel 78 to the level of the lower end of the electrode 90. When sufficient time has been allowed for the culture 40 in assembly 66 to grow the timer 94 causes a single total addition of medium 70 to be passed from the dosing vessel 78 to the assembly 66. This single addition doubles the volume of culture 40 and halves the cell density therein. After a short interval the timer 94 causes the peristaltic pump 86 to remove one half of the mixed culture 40 in the assembly 66 and pass it to the vessel 45, or to the assembly 68 where the culture grows under conditions identical to those existing in the assembly 66. Manual manipulation of clamps 90 and 91 allow discharge of culture 40 from assembly 66 to harvest vessel 45 or assembly 68. Clamp 89 retains culture 40 in assembly 68. The opening of clamps 89 and 92 or 96 discharges culture 40 from assembly 68 to either sampler 88 or harvest vessel 45. The solenoid valve 77 once again is then actuated by the timer 94 and relay 93 to refill the dosing vessel 78 so that the cycle may be repeated once again. The assembly 68 operates in the same manner as the apparatus shown in FIGS. 1 and 2 and delivers culture to the vessel 45. The sampler 88 is provided for sampling culture delivered from the assembly 68.

The apparatus of the invention has been found to be a relatively simple and inexpensive apparatus for use, for example, in conducting certain exploratory studies of multistage, continuous culture growth in laboratories. Whilst it has been found that the apparatus of the invention lacks the sophisticated performance of the so-called cyclone column culture growing apparatus, and the possibility of cultivating mycelial type (ramified) organisms, it retains the other advantages of the cyclone system and furthermore permits the cultivations of those organisms and tissues which are sensitive to the shearing effects of the pumps used in known apparatus.

Apparatus of the invention may be used, for example, for chemostat studies with yeast and bacteria, and for growing plant cells and algae. The high aeration of the culture, and the large ratio of surface area to culture volume obtained by the umbrella-shaped flowing film of culture, are experimental advantages of the apparatus of the invention, especially for the photosynthetic organisms.

In general the apparatus of the invention has been found to possess several additional advantages over known types of fermenting apparatus, such as, for example, the production of a very homogeneous culture, the relatively fast cycle of agitation (for example 100 ml per second) of the culture 40 prevents any formation of wall growth on the inner surface of the glass bell-jar 1, and permits representative harvesting of samples of the culture.

The apparatus of the invention has been used having a working capacity of 1,000 ml, but this working capacity may be changed with the apparatus used to any desired capacity of, for example, 500 to 1,5000 ml by adjusting the level of the outlet pipe 39 in the glass bell-jar. With this apparatus the culture draining surface 7 was 1,100 $cm^2$ and the film of culture draining down it was 0.33 mm thick. Approximately 40 ml of the 1,000 ml of culture was retained in the draining film. As already stated the culture 40 was circulated at the rate of 100 ml per second, which gave a circulation turnover time of ten seconds, and a transit time in the draining of the film of culture on the surface 7 of 0.38 seconds. The conditions of aeration were found to be similar to those obtained in the so-called cyclone column apparatus, and were found comparable with those observed in known types of stirred vessels.

Like the so-called cyclone column fermentation apparatus the apparatus of the invention does not promote foam formation and so permits the use of substrates having high foaming potential, such as molasses or peptones, without the addition of antifoam agents.

The apparatus of the invention may be used in a thermostat or temperature controlled room, and these conditions have been found adequate for ensuring that the culture is maintained under rigorous temperature control. The circulation of culture 40 produced by the diaphragm 15 eliminates any complications from being introduced by the joule effect heating of the culture 40 by conventional mechanical mixing systems. This in turn eliminates the need for a cooling system and retains the simplicity of the apparatus of the invention. This leads to advantages of the apparatus of the invention, when compared with conventional apparatus, in that the apparatus is relatively inexpensive, simple in operation and control.

Organisms with which the apparatus of the invention has been used are:
*Bacillus subtilis*
*Azotobacter vinelandii*
*Candida utilis*
*Saccharomyces rouxii*, and
Plant tissue cells such as Vicia, Rosa and Reseda.

We claim:

1. Non-ramified culture growing apparatus, comprising a vessel sealed from the surrounding atmosphere and having a culture draining surface in an upper portion thereof, conveying means for conveying culture from a lower portion of said vessel to said upper portion thereof, dispersing means for dispersing said conveyed culture as a film for draining down said draining surface to said lower portion, a fluid operated diaphragm pump for pumping culture along said conveying means, and a non-return valve connected to the culture inlet of said pump for causing culture to flow in the pumping direction.

2. Apparatus according to claim 1, which includes a plurality of small tubes along orbital like curved paths from said conveying means for gently agitating culture when it is disposed in a lower portion of said vessel.

3. Apparatus according to claim 1, wherein said fluid operated diaphragm pump comprises a base plate sealing a lower end of said vessel and having a culture cavity with said culture inlet thereto from the interior of said vessel, a diaphragm sealing the lower side of said culture cavity, a body portion having an air cavity with an air inlet and an air outlet thereto, said diaphragm being disposed between said base plate and said base plate to seal said culture cavity from said air cavity, and displaceable by air pressure in said air-cavity to force culture out of said culture cavity.

4. Apparatus according to claim 3, which includes a continuous lip in said air cavity and around said air outlet, such that pressure from culture within said cavity will cause said diaphragm to press against said lip and seal said air outlet.

5. Apparatus according to claim 1, which includes a culture outlet pipe extending upwardly into said vessel to form an overflow pipe for culture when it is disposed in the lower portion of said vessel.

6. Apparatus according to claim 5, wherein the height of said culture outlet pipe within said vessel is adjustable for adjusting the volume of culture when it is disposed in the vessel.

7. Apparatus according to claim 6, which includes a dosing means connected to receive culture from said supply vessel, a phasing unit connected to receive a predetermined volume of culture from said dosing means, and deliver it to said vessel having said draining surface, and control means for delivering from said dosing means, when the apparatus is in operation, said predetermined volume of culture to said phasing unit and, after a predetermined time interval, removing a predetermined quantity of said culture in said vessel having said draining surface and delivering it to said harvest vessel.

8. Apparatus according to claim 6, which includes a culture medium supply vessel, means for pumping culture from said supply vessel to said vessel having said draining surface, and a culture harvest vessel connected to receive culture from said culture outlet pipe.

9. Apparatus according to claim 8, wherein said vessel having said draining surface is one of a plurality of such vessels, each forming a fermentation stage in series flow between said supply vessel and said harvest vessel.

* * * * *